(12) United States Patent
Yang et al.

(10) Patent No.: US 11,294,528 B2
(45) Date of Patent: Apr. 5, 2022

(54) SENSING UNIT

(71) Applicant: Samsung Display Co., Ltd., Yongin-Si (KR)

(72) Inventors: Sung-jin Yang, Cheonan-si (KR); Minho Chae, Suwon-si (KR); Hyunsik Park, Cheonan-si (KR)

(73) Assignee: Samsung Display Co., Ltd.

( * ) Notice: Subject to any disclaimer, the term of this patent is extended or adjusted under 35 U.S.C. 154(b) by 148 days.

(21) Appl. No.: 16/412,435

(22) Filed: May 15, 2019

(65) Prior Publication Data

US 2020/0004362 A1 Jan. 2, 2020

(30) Foreign Application Priority Data

Jul. 2, 2018 (KR) .................. 10-2018-0076441

(51) Int. Cl.
*G06F 3/047* (2006.01)
*G06F 3/04886* (2022.01)
*G06F 3/044* (2006.01)

(52) U.S. Cl.
CPC ............ *G06F 3/047* (2013.01); *G06F 3/0443* (2019.05); *G06F 3/04886* (2013.01)

(58) Field of Classification Search
CPC ..... G06F 3/047; G06F 3/0443; G06F 3/04886
See application file for complete search history.

(56) References Cited

U.S. PATENT DOCUMENTS

| | | | |
|---|---|---|---|
| 2005/0239326 A1* | 10/2005 | Ishikura ................ | H01R 13/52 439/568 |
| 2011/0057893 A1 | 3/2011 | Kim et al. | |
| 2017/0221970 A1* | 8/2017 | Lee ..................... | H01L 51/5256 |
| 2017/0364194 A1 | 12/2017 | Jang et al. | |
| 2018/0252955 A1* | 9/2018 | Kurasawa ........... | G02F 1/13338 |
| 2019/0050104 A1* | 2/2019 | Na ........................ | G06F 3/0488 |
| 2019/0056821 A1* | 2/2019 | Choi .................... | G06F 3/0443 |
| 2019/0114006 A1* | 4/2019 | Sakaue ................ | G06F 3/0448 |
| 2019/0121466 A1* | 4/2019 | Sakaue ................ | G06F 3/0446 |
| 2019/0171306 A1* | 6/2019 | Kim ........................ | G06F 3/047 |
| 2020/0183537 A1* | 6/2020 | Sakaue ..................... | H05K 3/12 |
| 2020/0218401 A1* | 7/2020 | Tomooka .............. | G06F 3/0412 |

FOREIGN PATENT DOCUMENTS

| | | |
|---|---|---|
| KR | 10-1082293 B1 | 11/2011 |
| KR | 10-2017-0056798 A | 5/2017 |
| KR | 10-2017-0142243 A | 12/2017 |
| KR | 10-2018-0013531 A | 2/2018 |

* cited by examiner

*Primary Examiner* — Fred Tzeng
(74) *Attorney, Agent, or Firm* — Innovation Counsel LLP

(57) ABSTRACT

A sensing unit includes a base layer, a sensing pattern part including a first sensing pattern, a second sensing pattern, and a third sensing pattern, which are each disposed on the base layer, a sensing wire disposed on the base layer and electrically connected to the first sensing pattern, a connecting wire connecting the second sensing pattern to the third sensing pattern, a dummy wire disposed around an area on which the connecting wire is disposed, and a connecting part connecting the first sensing pattern to the sensing wire and overlapping the connecting wire on a plane. Here, a cut part is defined in the dummy wire.

20 Claims, 11 Drawing Sheets

SENSING UNIT

CROSS-REFERENCE TO RELATED APPLICATIONS

This U.S. non-provisional patent application claims priority under 35 U.S.C. § 119 of Korean Patent Application No. 10-2018-0076441, filed on Jul. 2, 2018, the entire contents of which are hereby incorporated by reference.

BACKGROUND

The present disclosure herein relates to a sensing unit having improved reliability.

An active area of a sensing unit may have a regular shape such as a circular or rectangular shape, or an irregular shape that is not so neatly defined. That is, the sensing unit may sense whether a touch is generated through the active area having various shapes and areas, even when such shapes and areas are irregular. Due to the irregular shaped active area, the sensing unit may require various types of wire designs.

SUMMARY

The present disclosure provides a method for designing wires of a sensing unit and a sensing unit having improved reliability.

An embodiment of the inventive concept provides a sensing unit including: a base layer; a sensing pattern part including a first sensing pattern, a second sensing pattern, and a third sensing pattern, which are each disposed on the base layer; a sensing wire disposed on the base layer and electrically connected to the first sensing pattern; a connecting wire connecting the second sensing pattern to the third sensing pattern; a dummy wire disposed around an area on which the connecting wire is disposed; and a connecting part connecting the first sensing pattern to the sensing wire and overlapping the connecting wire on a plane. Here, a cut part is defined in the dummy wire.

In an embodiment, the cut part may overlap the connecting part on the plane.

In an embodiment, the dummy wire may not overlap the connecting part on the plane.

In an embodiment, the cut part may not overlap the connecting part on the plane.

In an embodiment, the dummy wire may extend in a first direction, and the cut part may be spaced apart from the connecting part in the first direction on the plane.

In an embodiment, the cut part may be provided in plurality, and the cut parts may be spaced apart from each other with the connecting part therebetween on the plane.

In an embodiment, the connecting part may include: a first connecting electrode extending in a second direction from the first sensing pattern to the sensing wire; a second connecting electrode extending in the second direction from the first sensing pattern to the sensing wire and spaced apart from the first connecting electrode in a first direction; and a contact electrode configured to connect the first connecting electrode to the second connecting electrode and connected to the sensing wire.

In an embodiment, the cut part may overlap at least one of the first connecting electrode and the second connecting electrode on the plane.

In an embodiment, the first connecting electrode may include first and second sides each extending in the second direction crossing the first direction, the second connecting electrode may include third and fourth sides each extending in the second direction, and the cut part may be defined in an area that is adjacent to at least one of the first side, the second side, the third side, and the fourth side.

In an embodiment, the cut part may be provided in plurality, some of the cut parts may be spaced apart from each other with the first connecting electrode therebetween, and some of the cut parts may be spaced apart from each other with the second connecting electrode therebetween.

In an embodiment, a first sensing area, a second sensing area, and a third sensing area may be defined on the base layer, the first sensing pattern may be disposed on the first sensing area, the second sensing pattern may be disposed on the second sensing area, the third sensing pattern may be disposed on the third sensing area, the second sensing area and the third sensing area may be spaced apart from each other in a first direction, and each of the second and third sensing areas may protrude from the first sensing area in a second direction crossing the first direction.

In an embodiment, the dummy wire may be provided in plurality, and one portion of the dummy wires may be disposed between the connecting wire and the first sensing pattern, and another portion of the dummy wires may be disposed between the connecting wire and the sensing wire.

In an embodiment, the cut part may be defined by removing a partial area of the dummy wire.

In an embodiment, the cut part may be provided in plurality, and two cut parts that are adjacent to each other among the plurality of cut parts may be spaced by a first distance from each other.

In an embodiment, the first distance may be equal to or less than a width of the first sensing pattern.

In an embodiment of the inventive concept, a sensing unit includes: a sensing pattern part including a first sensing pattern, a second sensing pattern, and a third sensing pattern; a sensing wire electrically connected to the first sensing pattern; a connecting part connecting the sensing wire to the first sensing pattern; a connecting wire connecting the second sensing pattern to the third sensing pattern and crossing the connecting part on a plane; and a dummy wire which is disposed around an area on which the connecting wire is disposed and in which a cut part is defined in an area adjacent to an area in which the connecting part crosses the connecting wire.

In an embodiment, the connecting part may cross the connecting wire in a perpendicular manner on the plane.

In an embodiment, the connecting part may contain a transparent conductive material.

In an embodiment of the inventive concept, a sensing unit includes: a base layer on which a sensing area and a non-sensing area disposed adjacent to the sensing area are defined; a sensing wire disposed on the non-sensing area of the base layer; a dummy wire which is disposed on the non-sensing area of the base layer and in which at least one cut part is defined by removing one area thereof; an insulation layer disposed on the base layer to cover the sensing wire and the dummy wire; a sensing pattern disposed on the insulation layer and the sensing area; and a connecting part disposed on the insulation layer to connect the sensing pattern to the sensing wire. Here, the dummy wire is disposed between the sensing pattern and the sensing wire on a plane.

In an embodiment, the dummy wire may overlap the connecting part one the plane, and the cut part may not overlap the connecting part on the plane.

BRIEF DESCRIPTION OF THE FIGURES

The accompanying drawings are included to provide a further understanding of the inventive concept, and are incorporated in and constitute a part of this specification. The drawings illustrate exemplary embodiments of the inventive concept and, together with the description, serve to explain principles of the inventive concept. In the drawings.

DETAILED DESCRIPTION

Figure 1:
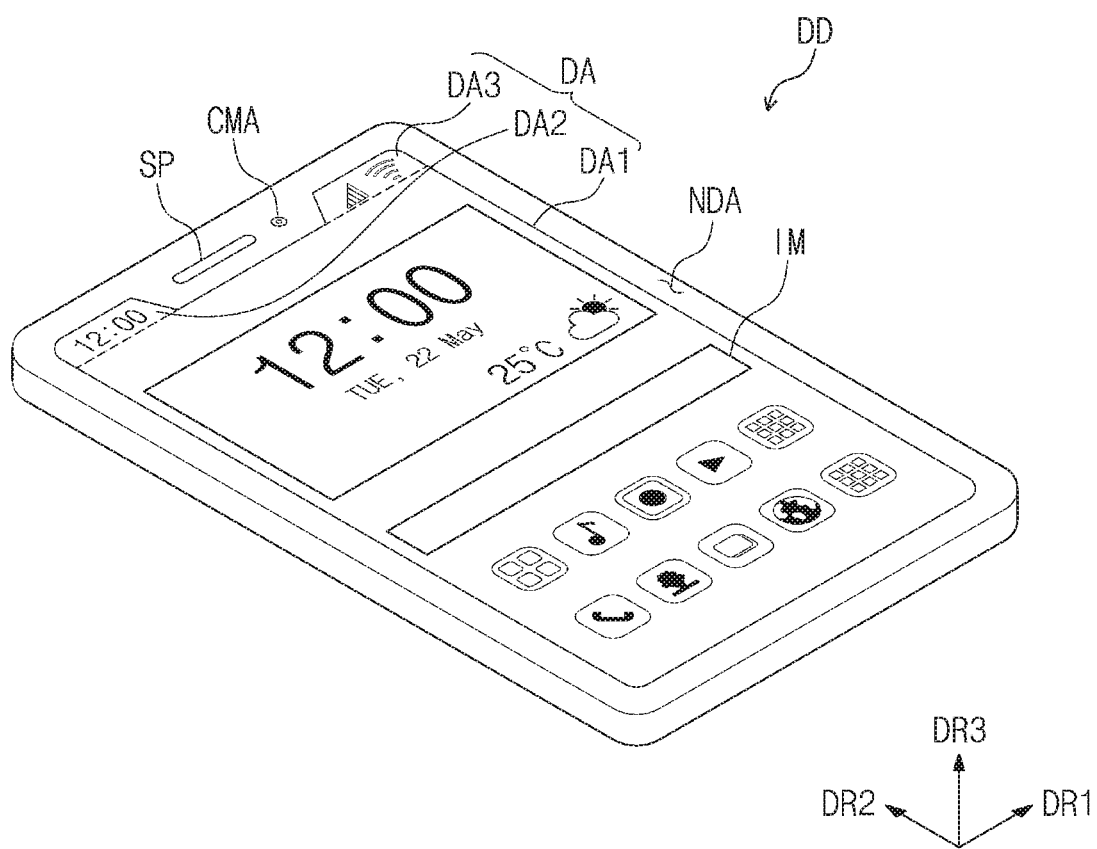
FIG. 1 is a perspective view illustrating a display device according to an embodiment of the inventive concept.

In this specification, it will also be understood that when one component (or region, layer, portion) is referred to as being 'on', 'connected to', or 'coupled to' another component, it can be directly disposed/connected/coupled on/to the one component, or an intervening third component may also be present.

Like reference numerals refer to like elements throughout. Also, in the figures, the dimensions of components are exaggerated for clarity of illustration.

As used herein, the term and/or includes any and all combinations of one or more of the associated listed items.

It will be understood that although the terms of first and second are used herein to describe various elements, these elements should not be limited by these terms. The terms are only used to distinguish one component from other components. For example, a first element referred to as a first element in one embodiment can be referred to as a second element in another embodiment. The terms of a singular form may include plural forms unless referred to the contrary.

Also, spatially relative terms, such as "below", "lower", "above", and "upper", may be used herein for ease of description to describe an element and/or a feature's relationship to another element(s) and/or feature(s) as illustrated in the drawings. The terms may be a relative concept and described based on directions expressed in the drawings.

Unless otherwise defined, all terms (including technical and scientific terms) used herein have the same meaning as generally understood by those skilled in the art. Terms as defined in a commonly used dictionary should be construed as having the same meaning as in an associated technical context, and unless defined apparently in the description, the terms are not ideally or excessively construed as having formal meaning.

The meaning of 'include' or 'comprise' specifies a property, a region, a fixed number, a step, a process, an element and/or a component but does not exclude other properties, regions, fixed numbers, steps, processes, elements and/or components.

Hereinafter, embodiments of the inventive concept will be described with reference to the accompanying drawings. FIG. 1 is a perspective view illustrating a display device according to an embodiment of the inventive concept.

Referring to FIG. 1, a display device DD may display an image IM through a display area DA. FIG. 1 illustrates application icons and a clock display window as an example of the image IM. In FIG. 1, the display area DA having a surface defined by a first direction DR1 and a second direction DR2 crossing the first direction DR1 is illustrated as an example. However, in another embodiment of the inventive concept, a display area (not shown) of a display device (not shown) may have a curved shape.

A thickness direction of the display device DD is a third direction DR3. However, directions indicated by the first to third directions DR1, DR2, and DR3 may be relative concepts and may thus be converted into different directions.

In the example of FIG. 1, the display device DD is illustrated as a portable electronic device. However, the display device DD may be also used for large-sized electronic devices such as a television, a monitor, or an outdoor advertisement board as well as a small and medium sized electronic devices such as a personal computer, a notebook computer, a personal digital terminal, a navigation unit for a vehicle, a game console, a smartphone, a tablet computer, and a camera. Also, these are only exemplary embodiments, and the display device may be adopted to other electronic devices so long as they do not deviate from the scope of the present disclosure.

The display area DA may have an irregular shape. For example, the display area DA may have a rectangular shape of which at least one side protrudes. The display area DA may include a first display area DA1, a second display area DA2, and a third display area DA3. Each of the second display area DA2 and the third display area DA3 may protrude from the first display area DA1 in the second direction DR2. The first display area DA1 may be referred to as a normal display area, and each of the second and third display areas DA2 and DA3 may be referred to as a notch display area.

The second display area DA2 and the third display area DA3 are spaced apart from each other in the first direction DR1. A speaker SP and a camera module CMA may be disposed between the second display area DA2 and the third display area DA3. On a plane formed by the first direction DR1 and second direction DR2, the speaker SP and the camera module CMA may overlap a non-display area NDA around the display area DA. The non-display area NDA may be an area on which an image is not displayed. The non-display area NDA may surround the display area DA. However, the embodiment of the inventive concept is not limited thereto. For example, the display area DA and the non-display area NDA may be designed relative to each other to conform to each other's different shapes.

Figure 2:
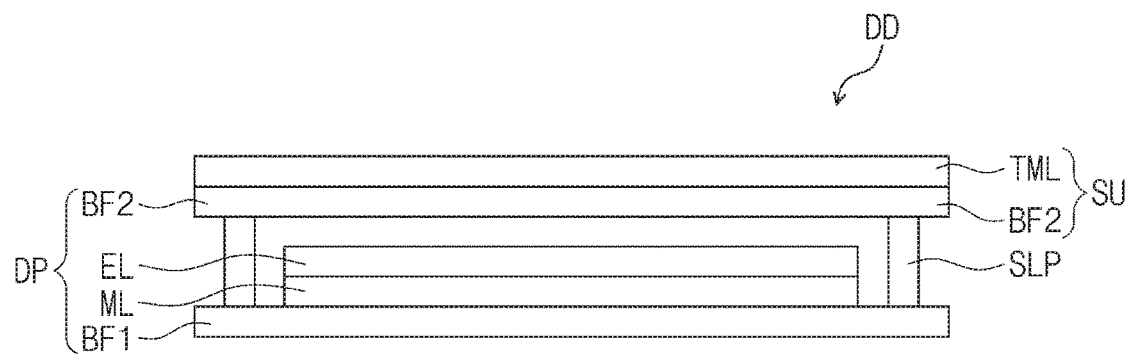
FIG. 2 is a schematic cross-sectional view illustrating a display device according to an embodiment of the inventive concept.
Figure 2:
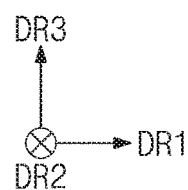

FIG. 2 is a schematic cross-sectional view illustrating a display device according to an embodiment of the inventive concept.

Referring to FIG. 2, the display device DD may include a display panel DP and a sensing unit SU.

Although the display panel DP may be a light emitting-type display panel, the embodiment of the inventive concept is not limited thereto. For example, the display panel DP may be an organic light emitting display panel or a quantum dot light emitting display panel. The organic light emitting display panel includes a light emitting layer containing an organic light emitting material. The quantum dot light emitting display panel includes a light emitting layer containing a quantum dot and/or a quantum dot rod. Hereinafter, the display panel DP will be described as the organic light emitting display panel.

The display panel DP includes a first base layer BF1, a circuit layer ML, a light emitting element layer EL, and a second base layer BF2.

The first base layer BF1 may include a plastic substrate, a glass substrate, or an organic/inorganic composite substrate. Alternatively, the first base layer BF1 may be a laminate structure including a plurality of insulation layers. The plastic substrate may include at least one of an acrylic-based resin, a methacrylic-based resin, a polyisoprene-based resin, a vinyl-based resin, an epoxy-based resin, a urethane-based resin, a cellulose-based resin, a siloxane-based resin, a polyimide-based resin, a polyamide-based resin, and a perylene-based resin.

The circuit layer ML may include a plurality of insulation layers, a plurality of conductive layers, and a semiconductor layer. The plurality of conductive layers of the circuit layer ML may constitute signal lines or a control circuit of a pixel.

The light emitting element layer EL includes a display element, such as organic light emitting diodes. However, the present inventive concept is not limited thereto. For example, the light emitting element layer EL may include inorganic light emitting diodes or organic-inorganic hybrid light emitting diodes according to the kind of the display panel DP.

The second base layer BF2 seals the light emitting element layer EL. The second base layer BF2 protects the light emitting element layer EL from foreign substances such as moisture, oxygen, and dust particles. The second base layer BF2 may include a plastic substrate, a glass substrate, or an organic/inorganic composite substrate. Alternatively, the second base layer BF2 may be a laminate structure including a plurality of insulation layers.

The second base layer BF2 may be coupled to the first base layer BF1 through a sealing part SLP. The sealing part SLP may contain frit. However, the present inventive concept is not limited to the sealing part SLP containing frit, and may include other material forming the sealing part SLP.

The sensing unit SU may be disposed on the display panel DP. The sensing unit SU may include a second base layer BF2 and a sensing circuit layer TML. The display panel DP and the sensing unit SU may share the second base layer BF2.

The sensing circuit layer TML may include a plurality of insulation layers and a plurality of conductive layers. The plurality of conductive layers of the sensing circuit layer TML may constitute a sensing pattern, a sensing wire, and a connecting wire.

Figure 3:
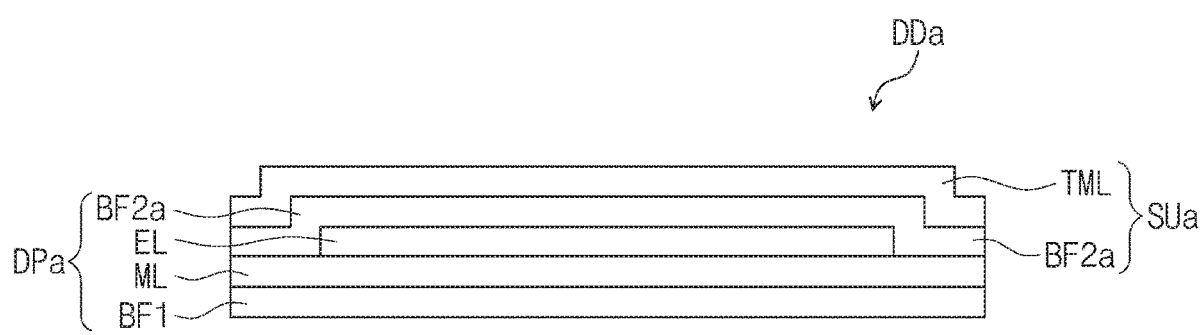
FIG. 3 is a schematic cross-sectional view illustrating a display device according to an embodiment of the inventive concept.
Figure 3:
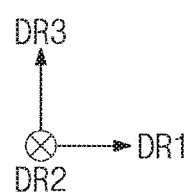

FIG. 3 is a schematic cross-sectional view illustrating a display device according to an embodiment of the inventive concept.

Referring to FIG. 3, a display device DDa may include a display panel DPa and a sensing unit SUa.

The display panel DPa includes a first base layer BF1, a circuit layer ML, a light emitting element layer EL, and a second base layer BF2a.

The second base layer BF2a seals the light emitting element layer EL. The second base layer BF2a may be referred to as a thin-film encapsulation layer.

The second base layer BF2a includes at least one insulation layer. The second base layer BF2a according to an embodiment of the inventive concept may include at least one encapsulation organic film and at least one encapsulation inorganic film.

The encapsulation inorganic film protects the light emitting element layer EL from moisture/oxygen, and the encapsulation organic film protects the light emitting element layer EL from other foreign substances. Although the encapsulation inorganic film may include a silicon nitride layer, a silicon oxynitride layer, a silicon oxide layer, a titanium oxide layer, or an aluminum oxide layer, the the present inventive concept is not limited thereto. Although the encapsulation organic film may include an acryl-based organic layer, the present inventive concept is not limited thereto.

The sensing unit SUa may include a second base layer BF2a and a sensing circuit layer TML. The display panel DPa and the sensing unit SUa may share the second base layer BF2a. The sensing circuit layer TML may include a plurality of insulation layers and a plurality of conductive layers. For example, the conductive layers of the sensing circuit layer TML may constitute a sensing pattern, a sensing wire, and a connecting wire. The sensing circuit layer TML may be formed on the second base layer BF2a in a continuous process.

Although the sensing circuit layer TML is directly formed on the second base layer BF2 and BF2a, which is shared with the display panel DP and DPa, as shown in the examples in FIGS. 2 and 3, the present inventive concept is not limited thereto. For example, each of the sensing units SU and SUa may include a separate base layer that is not shared with the display panels DP and DPa. The sensing circuit layer TML may be formed on the base layer, and the base layer is coupled to the second base layer BF2 and BF2a by an adhesive member (not shown). The adhesive member may be an organic adhesive layer such as an optically clear adhesive film (OCA), an optically clear resin (OCR), or a pressure sensitive adhesive film (PSA).

Figure 4:
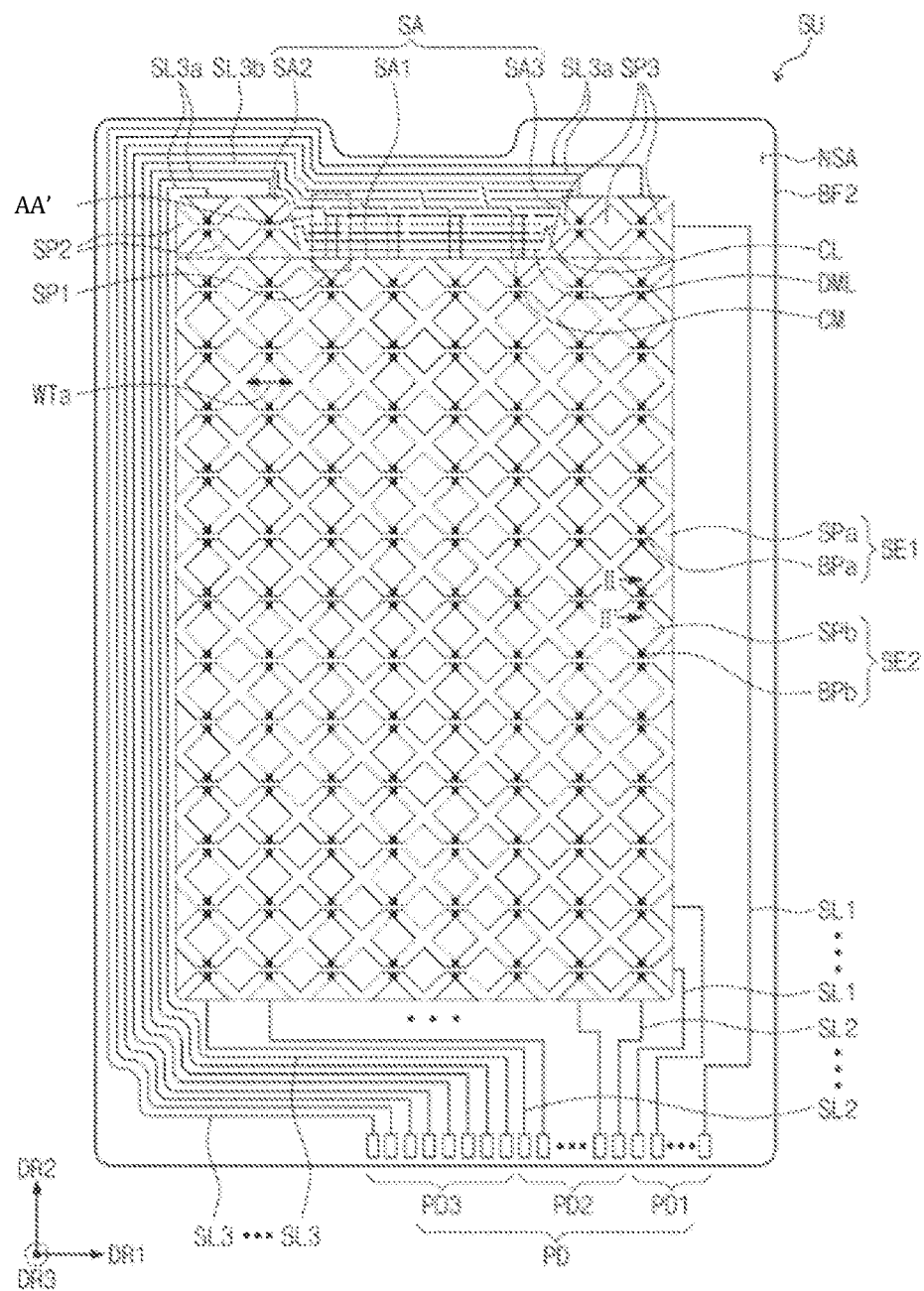
FIG. 4 is a plan view illustrating a sensing unit according to an embodiment of the inventive concept.

FIG. 4 is a plan view illustrating a sensing unit according to an embodiment of the inventive concept.

Referring to FIG. 4, the second base layer BF2 may include a sensing area SA and a non-sensing area NSA adjacent to the sensing area SA.

The sensing area SA may be an area that senses an input applied from the outside. The input applied from the outside may be provided in various ways. For example, the external input may include various types of external inputs such as a portion of a human body (e.g., hands), a stylus pen, light, heat, or pressure. Also, in addition to the input of direct contact of a portion of a human body such as user's hands, a spaced touch (e.g. hovering a finger over the sensing area SA), i.e., being close or adjacent to the sensing area SA, may be one type of the input.

The sensing area SA may include a first sensing area SA1, a second sensing area SA2, and a third sensing area SA3. The first sensing area SA1 may have a rectangular shape on a plane. Each of the second sensing area SA2 and the third sensing area SA3 may protrude from the first sensing area SA1 in the second direction DR2. The first sensing area SA1 may be referred to as a normal sensing area, and each of the second and third sensing areas SA2 and SA3 may be referred to as a notch sensing area.

In an embodiment of the inventive concept, in addition to the first sensing area SA1, the second and third sensing areas SA2 and SA3 are illustrated as examples. However, the present inventive concept is not limited in the number of the sensing areas protruding from the first sensing area SA1. For example, the number of the sensing area protruding from the first sensing area SA1 may be one or three or more. The camera module CMA and the speaker SP, which are described with reference to FIG. 1, may be disposed between the second sensing area SA2 and the third sensing area SA3.

The second sensing area SA2 may protrude from one area of an edge at one side of the first sensing area SA1 in the second direction DR2, and the third sensing area SA3 may protrude from another area of the edge at one side of the first sensing area SA1 in the second direction DR2. The second sensing area SA2 and the third sensing area SA3 may be spaced apart from each other in the first direction DR1.

The sensing unit SU may include first sensing sensor electrodes SE1 and second sensing sensor electrodes SE2.

The first sensing sensor electrodes SE1 may be arranged in the second direction DR2, and the second sensing sensor electrodes SE2 may be arranged in the first direction DR1. Each of the first sensing sensor electrodes SE1 may include first sensing parts SPa and first sensing connection parts BPa. Each of the second sensing sensor electrodes SE2 may include second sensing parts SPb and second sensing connection parts BPb.

The first sensing parts SPa may be arranged in the first direction DR1, and two first sensing parts SPa, which are disposed adjacent to each other, may be electrically connected to each other by the first sensing connection part BPa. The second sensing parts SPb may be arranged in the second direction DR2, and two second sensing parts SPb, which are disposed adjacent to each other, may be electrically connected to each other by the second sensing connection part BPb.

The first and second sensing parts SPa and SPb may be disposed in the sensing area SA to sense a touch. Each of the first and second sensing parts SPa and SPb may contain a transparent conductive oxide. For example, each of the first and second sensing parts SPa and SPb may include at least one of an indium zinc oxide (IZO), an indium tin oxide (ITO), an indium gallium oxide (IGO), an indium zinc gallium oxide (IGZO), and a mixture/compound thereof. However, the present inventive concept is not limited thereto. For example, each of the first and second sensing parts SPa and SPb may contain a metal material. The metal material may include, e.g., molybdenum, silver, titanium, copper, aluminum, or an alloy thereof. In this case, each of the first and second sensing parts SPa and SPb may have a metal mesh structure to reduce a possibility in which the patterns are seen from the outside.

The first and second sensing parts SPa and SPb may be collectively referred to as a sensing pattern part and classified into first to third sensing patterns SP1, SP2, and SP3 according to arranged positions For example, among the first and second sensing parts SPa and SPb, sensing parts disposed in the first sensing area SA1 may be referred to as a first sensing pattern SP1, sensing parts disposed in the second sensing area SA2 may be referred to as a second sensing pattern SP2, and sensing parts disposed in the third sensing area SA3 may be referred to as a third sensing pattern SP3.

In a non-sensing area NSA, first to third sensing wires SL1, SL2, and SL3 electrically connected to the first and second sensing sensor electrodes SE1 and SE2 may be disposed.

Each of the first sensing wires SL1 may be electrically connected to one end of each of the first sensing sensor electrodes SE1 in a one-to-one corresponding manner. Each of the second sensing wires SL2 may be electrically connected to one end of each of the second sensing sensor electrodes SE2 in a one-to-one corresponding manner. Each of the third sensing wires SL3 may be electrically connected to the other end of each of the second sensing sensor electrodes SE2 in a one-to-one corresponding manner.

A pad part PD may include first to third pads PD1, PD2, and PD3. Each of the first pads PD1 may be electrically connected to each of the first sensing wires SL1 in a one-to-one correspondence manner. Each of the second pads PD2 may be electrically connected to each of the second sensing wires SL2 in a one-to-one correspondence manner. Each of the third pads PD3 may be electrically connected to each of the third sensing wires SL3 in a one-to-one correspondence manner.

According to an embodiment of the inventive concept, one side of each of the second sensing sensor electrodes SE2 may be electrically connected to one corresponding second pad of the second pads PD2 through a corresponding second sensing wire SL2, and the other side of each of the second sensing sensor electrodes SE2 may be electrically connected to one corresponding third pad of the third pads PD3 through a corresponding third sensing wire SL3. That is, a plurality of sensing wires SL2 and SL3 may be connected to one second sensing sensor electrode SE2. Accordingly, a limitation such as sensitivity degradation due to voltage drop of an electrical signal according to positions may be enhanced.

Sensing patterns disposed on the second and third sensing areas SA2 and SA3, which are necessarily electrically connected to each other, may be electrically connected to each other by a connecting wire CL. Referring to FIG. 4, reference numerals are applied to the sensing patterns that are necessarily connected to each other. Although the third sensing pattern SP3 may receive or transmit a signal through the first sensing wire SL1, the second sensing pattern SP2 is not connected to the first to third sensing wires SL1, SL2, and SL3. According to an embodiment of the inventive concept, the second sensing pattern SP2 may be connected to the third sensing pattern SP3 through the connecting wire CL. Accordingly, the second sensing pattern SP2 may receive or transmit a signal through the first sensing wire SL1 connected to the third sensing pattern SP3.

The third sensing wires SL3 may be classified into third sensing wires SL3a and third sensing wires SL3b. The third sensing wires SL3a may be sensing wires that are directly connected to the second sensing sensor electrode SE2, and the third sensing wires SL3b may be sensing wires that are not directly connected to the second sensing sensor electrode SE2

For example, the connecting wire CL may be disposed between a portion of the third sensing wires SL3b and the second sensing sensor electrode SE2. Accordingly, the third sensing wires SL3b may be spaced apart from the first sensing area SA1, with the connecting wire CL disposed between the third sensing wires SL3b and the first sensing area SA1.

Each of the third sensing wires SL3*b* may be electrically connected to the corresponding first sensing pattern SP1 disposed on the first sensing area SA1. A connecting part CM may be provided to electrically connect one third sensing wire SL3*b* to one first sensing pattern SP1.

On a plane, the connecting part CM and the connecting wire CL may cross each other. For example, the connecting part CM and the connecting wire CL may cross each other in a perpendicular manner.

According to an embodiment of the inventive concept, dummy wires DML may be provided in the non-sensing area NSA. The dummy wires DML may be disposed in an area in which the first to third sensing wires SL1, SL2, and SL3 and the connecting wire CL are not disposed. The dummy wires DML may be floating wires. The dummy wires DML may serve to prevent the area, in which the first to third sensing wires SL1, SL2, and SL3 and the connecting wire CL are not disposed, from being seen by the user. Also, the dummy wires DML may serve to protect the display device DD (refer to FIG. 1) from static electricity that is generated while processing or using.

In a plane, the dummy wires DML may be disposed between the sensing area SA and the connecting wire CL, between the connecting wire CL and the third sensing wires SL3, and/or the like. However, the present inventive concept is not limited to the above-mentioned configuration. For example, the dummy wires DML may be disposed in various other areas. For example, the dummy wires DML may be disposed in such as areas as between the sensing area SA and the first to third sensing wires SL1, SL2, and SL3, between first sensing wires SL1, between second sensing wires SL2, and between third sensing wires SL3.

Figure 5:
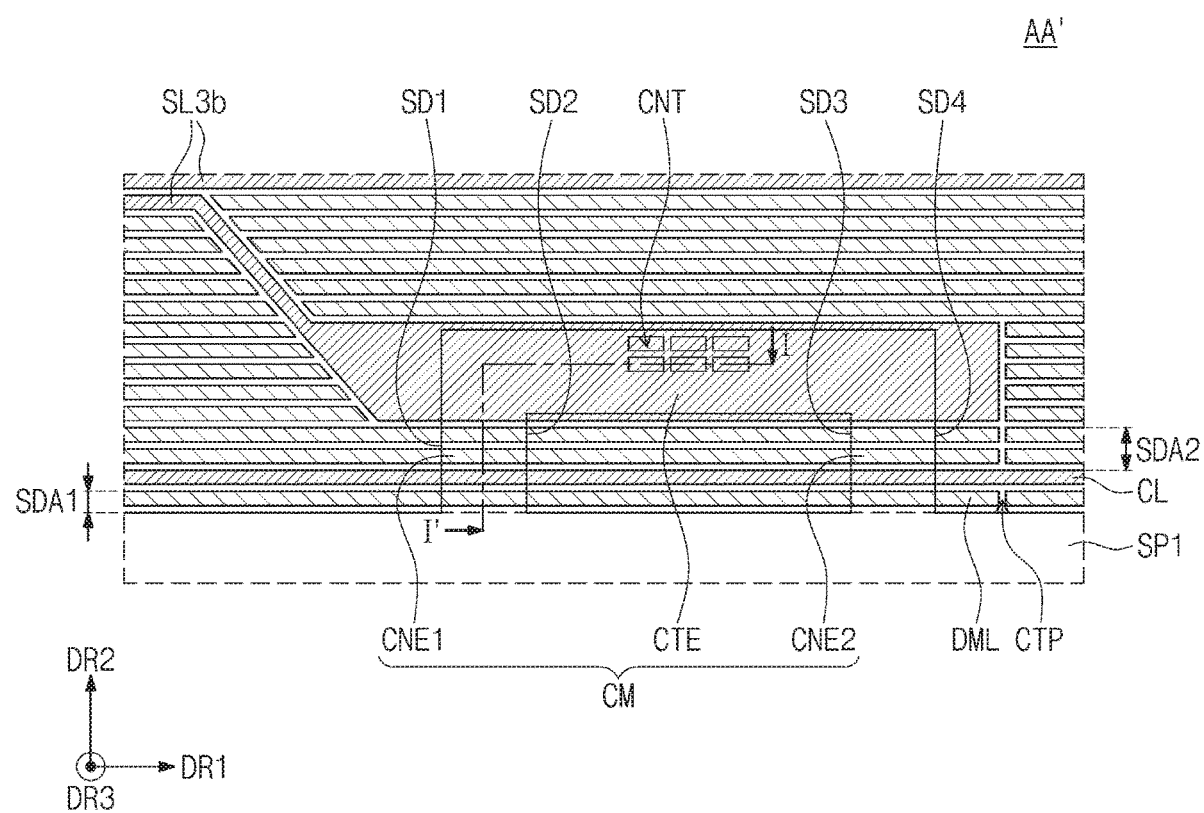
FIG. 5 is an enlarged plan view illustrating a portion of FIG. 4 according to an embodiment of the inventive concept.

The dummy wires DML that are disposed between the third sensing wires SL3*b* and the first sensing area SA1 may be provided with a cut part CTP (refer to FIG. 5). According to an embodiment of the inventive concept, one third sensing wire SL3*b* and one first sensing pattern SP1 may be connected to each other by one connecting part CM. In the process of connecting the connecting part CM to the third sensing wire SL3*b*, a phenomenon in which an insulation layer covering the dummy wires DML is damaged may occur. For example, when the insulation layer overlapping the connecting part CM on the plane is damaged, the connecting part CM may be electrically connected to the dummy wire disposed below the damaged insulation layer. Accordingly, the same signal as that applied to the third sensing wire SL3*b* may be applied to the dummy wire. In this case, coupling capacitance may be generated between the connecting wire CL and the dummy wire DML, and the generated coupling capacitance may act as noise that reduces sensing sensitivity. According to an embodiment of the inventive concept, a cut part CTP may be defined in the dummy wires DML to reduce the negative effects of the coupling capacitance. For example, the cut part CTP may be defined in an area adjacent to an area on which the connecting part CM and the connecting wire CL cross each other.

FIG. 5 is an enlarged plan view illustrating one portion of FIG. 4 according to an embodiment of the inventive concept.

Referring to FIG. 5, the connecting part CM may include a first connecting electrode CNE1, a second electrode CNE2, and a contact electrode CTE.

Each of the first connecting electrode CNE1 and the second connecting electrode CNE2 may extend in a direction from the first sensing pattern SP1 to the third sensing wire SL3*b*. For example, the direction may be the second direction DR2. The first connecting electrode CNE1 and the second connecting electrode CNE2 may be spaced apart from each other in the first direction DR1, and the first connecting electrode CNE1 and the second connecting electrode CNE2 may be coupled to each other by the contact electrode CTE. The first connecting electrode CNE1, the second connecting electrode CNE2, and the contact electrode CTE may have an integrated shape.

The contact electrode CTE may extend from the first connecting electrode CNE1 in a direction different from the direction in which the first connecting electrode CNE1 extends. For example, the contact electrode CTE may extend from the first connecting electrode CNE1 in the first direction DR1. Although an example connecting part CM is illustrated in FIG. 5, the present inventive concept is not limited to the shape of the connecting part CM. For example, the connecting part CM may have various other shapes as long as the first sensing pattern SP1 and the third sensing pattern SP3*b* are connected to each other.

Figure 6A:
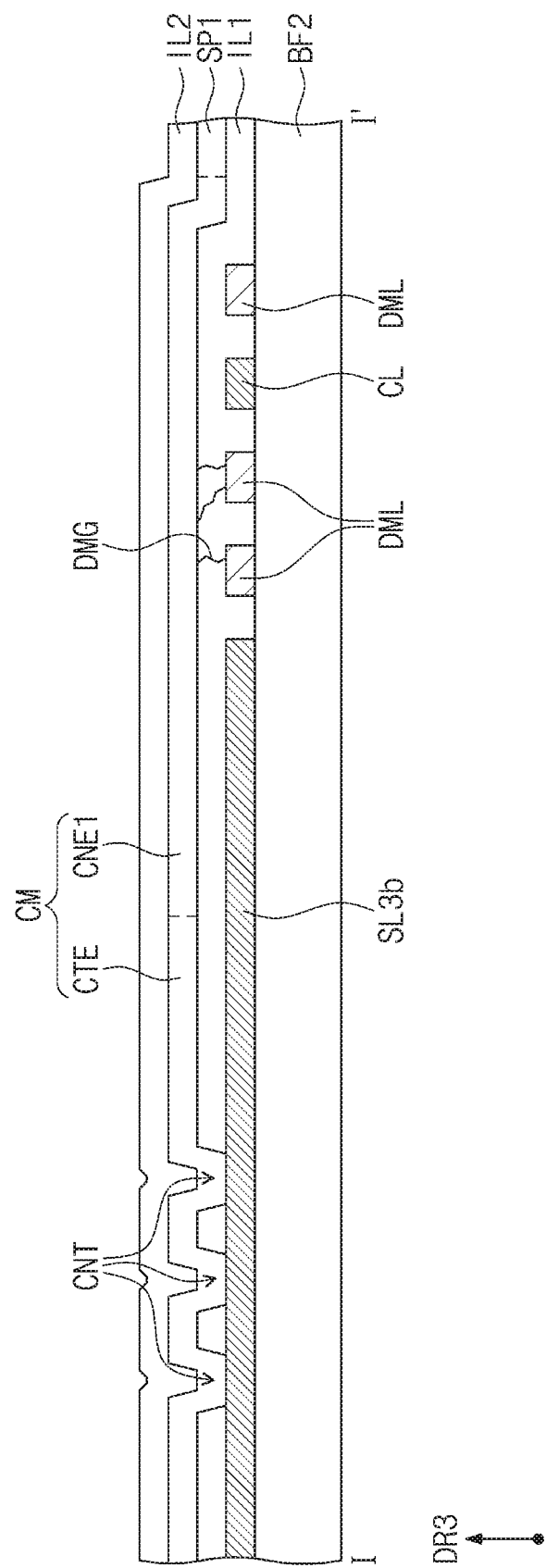
FIG. 6A is a cross-sectional view taken along a line I-I' of FIG. 5.

Referring to FIG. 6A, a first insulation layer IL1 is disposed between the connecting part CM and the third sensing wire SL3*b* on a cross-section. A contact hole CNT may be defined in the first insulation layer ILL The contact hole CNT may be defined in an area overlapping the contact electrode CTE on the plane. The connecting part CM may pass through the contact hole CNT to contact the third sensing wire SL3*b*.

Referring to FIG. 5 again, the cut part CTP may be defined in the dummy wires DML. The cut part CTP may be defined by removing a partial area of the dummy wire DML. For example, the cut part CTP may be defined in the dummy wires DML, which is disposed in a peripheral area of an area on which the connecting wire CL is disposed. For example, the peripheral area may include a first peripheral area SDA1 defined between the first sensing area SA1 (refer to FIG. 4) and the connecting wire CL and a second peripheral area SDA2 defined between the connecting wire CL and the third sensing wire SL3*b*.

On the plane, a portion of the first peripheral area SDA1 and a portion of the second peripheral area SDA2 may overlap a portion of the connecting part CM. Accordingly, when the first insulation layer IL1 in FIG. 6A is damaged with damage DMG, the connecting part CM and the dummy wire DML may be short-circuited. In this case, the same signal as that applied to the third sensing wire SL3*b* may be applied to the dummy wire DML. According to an embodiment of the inventive concept, the cut part CTP is defined in the dummy wire DML disposed on the first peripheral area SDA1 and the second peripheral area SDA2. The cut part CTP may be provided in plurality in the dummy wire DML extending in one direction, and the plurality of cut parts CTP may be spaced a predetermined distance from each other. Accordingly, the dummy wire DML may have a predetermined length or less between the cut parts CTP. The predetermined length may be a distance between two cut parts CTP that are most adjacent to each other in one dummy wire DML, e.g., along the first direction DR1. Also, the predetermined length may be, e.g., equal to or less than about 8 mm and greater than about 0 mm, or equal to or less than about 4 mm or greater than about 0 mm.

According to an embodiment of the inventive concept, although the connecting part CM is electrically connected to the dummy wire DML, since the dummy wire DML has a predetermined length, an amount of coupling capacitance generated between the dummy wire DML and the connecting wire CL may have be less than or equal to a predetermined value. That is, a ratio of a variation amount caused by the above coupling capacitance to a variation amount of entire capacitance of sensing a touch may be equal to or less than a predetermined ratio. That is, as the cut part CTP is defined in the dummy wire DML, a phenomenon, in which data is distorted by the coupling capacitance, may decrease.

According to an embodiment of the inventive concept, the cut part CTP may be defined at one side of the connecting part CM. The first connecting electrode CNE1 may include a first side SD1 and a second side SD2, and the second connecting electrode CNE2 may include a third side SD3 and a fourth side SD4. Each of the first to fourth sides SD1, SD2, SD3, and SD4 may extend in the second direction DR2. The cut part CTP may be defined in an area adjacent to at least one of the first to fourth sides SD1, SD2, SD3, and SD4. For example, in FIG. 5, the cut part CTP is defined in an area adjacent to the fourth side SD4. That is, the cut part CTP may be defined at the right side of the connecting part CM.

However, the present inventive concept is not limited thereto. For example, the cut part CTP may be defined between the second side SD2 and the third side SD3 and may be defined in an area adjacent to the first side SD1, e.g., at the left side of the first side SD1.

The dummy wire DML may extend in the first direction DR1, and the cut part CTP may be spaced apart from the connecting part CM in the first direction DR1 on the plane. On the plane, the cut part CTP may not overlap the connecting part CM.

Although not shown in the enlarged view of FIG. 5, cut parts CTP, may further be defined in each of the dummy wires DML disposed around the connecting parts DM in FIG. 4.

Figure 6B:
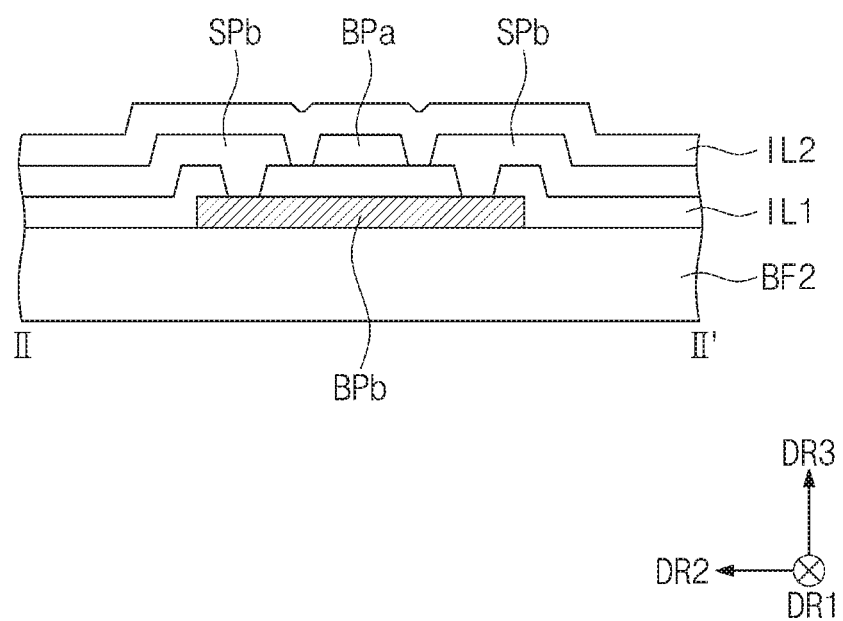
FIG. 6B is a cross-sectional view taken along line II-II' in FIG. 4.

FIG. 6A is a cross-sectional view taken along line I-I' of FIG. 5. FIG. 6B is a cross-sectional view taken along line II-II' in FIG. 4.

Referring to FIG. 6A, the third sensing wire SL3b, the dummy wire DML, and the connecting wire CL are disposed on the same layer. The third sensing wire SL3b, the dummy wire DML, and the connecting wire CL may be simultaneously formed through the same process. However, the dummy wire DML in FIG. 6A is illustrated with a hatching pattern, which is different from that used for the third sensing wire SL3b and the connecting wire CL, to easily distinguish one component from another component within the illustration.

The third sensing wire SL3b, the dummy wire DML, and the connecting wire CL may be covered by the first insulation layer IL1. The connecting part CM and the first sensing pattern SP1 may be disposed on the first insulation layer IL1. That is, the connecting part CM and the first sensing pattern SP1 may be simultaneously formed through the same process. The connecting part CM and the first sensing pattern SP1 are covered by the second insulation layer IL2. Each of the first insulation layer IL1 and the second insulation layer IL2 may be an inorganic layer or an organic layer. When each of the first insulation layer IL1 and the second insulation layer IL2 is an inorganic layer, each of the first insulation layer IL1 and the second insulation layer IL2 may contain at least one of a silicon oxide, a silicon nitride, and a silicon oxynitride. However, the embodiment of the inventive concept is not limited thereto.

Referring to FIGS. 6A and 6B, a second sensing connecting part BPb may be disposed on the same layer as the third sensing wire SL3b, the dummy wire DML, and the connecting wire CL, and the first sensing connection part BPa may be disposed on the same layer as the connecting part CM and the first sensing pattern SP1. The first sensing connection part BPa and the second sensing connection part BPb may be insulated from each other by the first insulation layer IL1 disposed between the first sensing connection part BPa and the second sensing connection part BPb.

In an embodiment of the inventive concept, the connecting part CM may contain the same material as the first sensing pattern SP1. For example, the connecting part CM may contain a transparent conductive oxide. For example, each of the connecting part CM may include at least one of an indium zinc oxide (IZO), an indium tin oxide (ITO), an indium gallium oxide (IGO), an indium zinc gallium oxide (IGZO), and a mixture/compound thereof. In another embodiment, the connecting part CM may contain a metal material. The metal material may include, e.g., molybdenum, silver, titanium, copper, aluminum, or an alloy thereof.

Figure 7A:
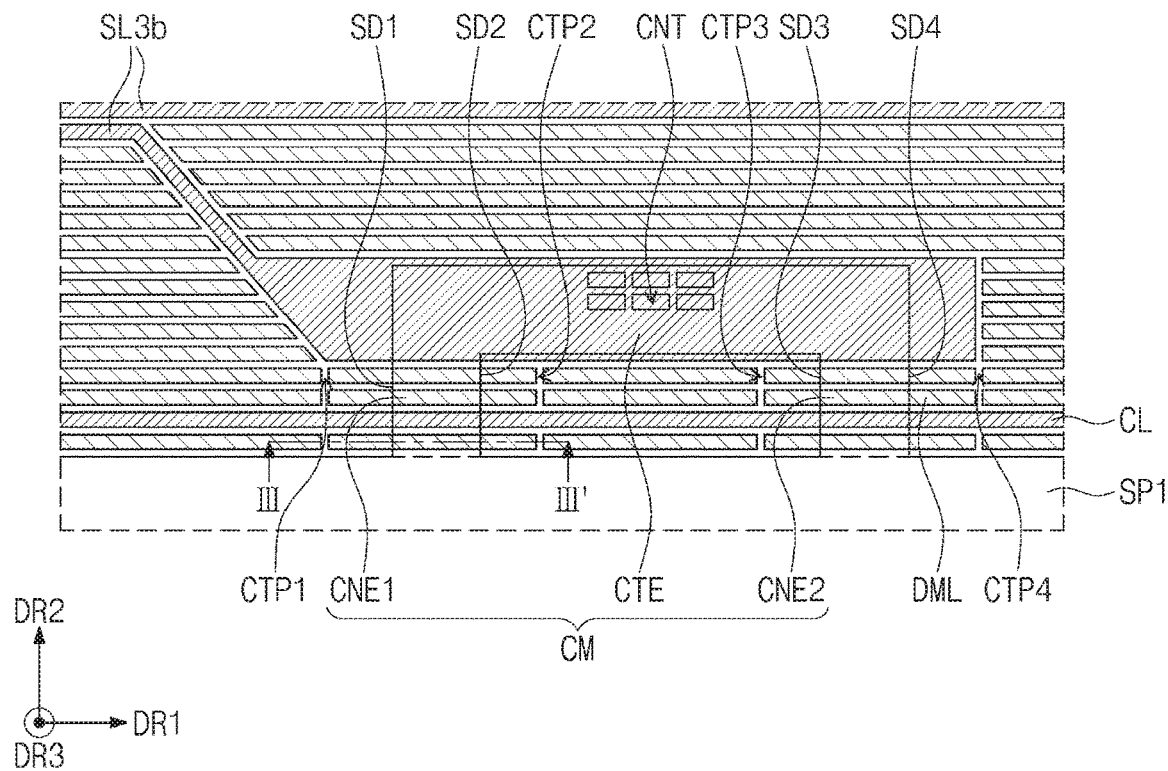
FIG. 7A is an enlarged plan view illustrating an area corresponding to area AA' in FIG. 4 according to an embodiment of the inventive concept.
Figure 7B:
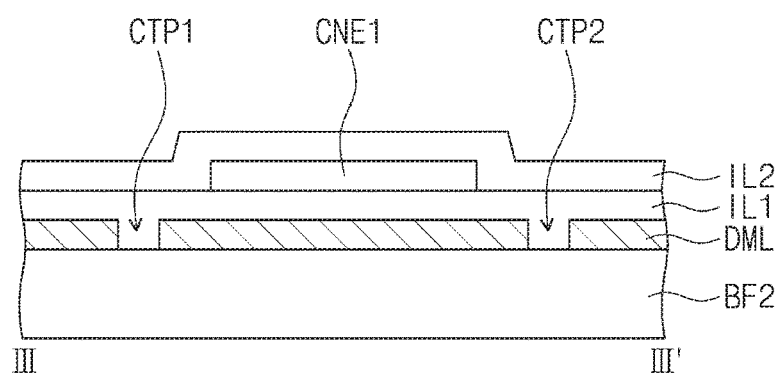
FIG. 7B is a cross-sectional view taken along line III-III' of FIG. 7A.
Figure 7B:
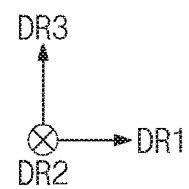

FIG. 7A is an enlarged plan view illustrating an area corresponding an area AA' in FIG. 4 according to an embodiment of the inventive concept, and FIG. 7B is a cross-sectional view taken along line III-III' of FIG. 7A.

Referring to FIGS. 7A and 7B, a plurality of cut parts CTP1, CTP2, CTP3, and CTP4 may be defined in each of the dummy wires DML disposed around one connecting part CM. The plurality of cut parts CTP1, CTP2, CTP3, and CTP4 may include a first cut part CTP1, a second cut part CTP2, a third cut part CTP3, and a fourth cut part CTP4.

In FIG. 7A, for convenience of illustration, only one first cut part CTP1, only one second cut part CTP2, only one third cut part CTP3, and only one fourth cut part CTP4 of the first to fourth cut parts CTP1, CTP2, CTP3, and CTP4 are indicated by reference numerals.

On the plane, a first connecting electrode CNE1 may be disposed between the first cut part CTP1 and the second cut part CTP2. On the plane, a second connecting electrode CNE2 may be disposed between the third cut part CTP3 and the fourth cut part CTP4. The first cut part CTP1 and the second cut part CTP2 may be spaced apart from each other with the first connecting electrode CNE1 therebetween, and the third cut part CTP3 and the fourth cut part CTP4 may be spaced apart from each other with the second connecting electrode CNE2 therebetween.

According to an embodiment of the inventive concept, at least four cut parts CTP1, CTP2, CTP3, and CTP4 may be defined in a peripheral area of one connecting part CM on an imaginary line extending in the first direction DR1. One first sensing pattern SP1 and all of the four cut parts CTP1, CTP2, CTP3, and CTP4 may overlap each other in the second direction DR2. Accordingly, a distance between two adjacent cut parts may be equal to or less than a width WTa (refer to FIG. 4) of the first sensing pattern SP1.

Referring to FIG. 7B, as the first insulation layer IL1 below the first connecting electrode CNE1 is damaged, the first connecting electrode CNE1 may be electrically connected to a portion of the dummy wires DML disposed therebelow. According to an embodiment of the inventive concept, the cut parts CTP1 and CTP2 are defined in area adjacent to the respective dummy wires DML overlapping the first connecting electrode CNE1 on the plane. In this case, although at least a portion of the dummy wires DML is short-circuited with the connecting part CM, since each of the dummy wires DML has a short length, an amount of coupling capacitance generated between the dummy wires DML and the connecting wire CL may be equal to or less than a predetermined value. Accordingly, a phenomenon in which the sensing sensitivity of the sensing unit SU (refer to FIG. 4) is reduced by the coupling capacitance, and a misrecognition phenomenon in which a touch that is not generated is recognized as a touch, may be prevented.

Figure 8A:
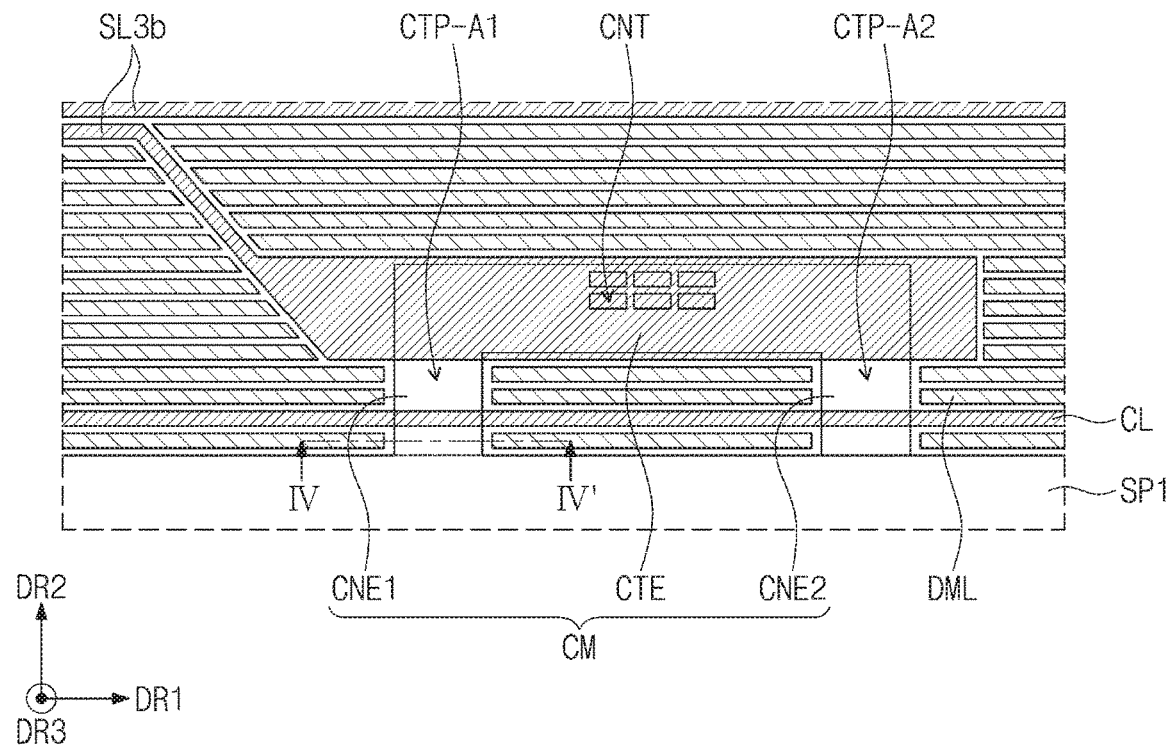
FIG. 8A is an enlarged plan view illustrating an area corresponding to area AA' in FIG. 4 according to an embodiment of the inventive concept.
Figure 8B:
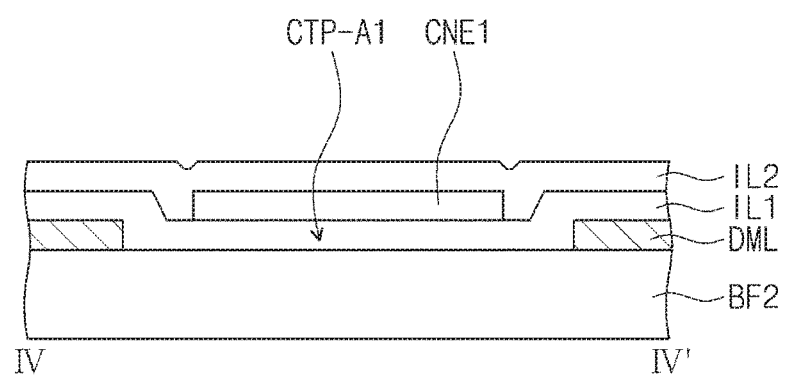
FIG. 8B is a cross-sectional view taken along line IV-IV' of FIG. 8A.
Figure 8B:
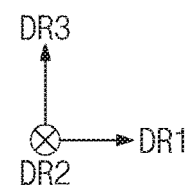

FIG. 8A is an enlarged plan view illustrating an area corresponding an area AA' in FIG. 4 according to an embodiment of the inventive concept, and FIG. 8B is a cross-sectional view taken along line IV-IV' of FIG. 8A.

Referring to FIGS. 8A and 8B, cut parts CTP-A1 and CTP-A2 are defined in each of the dummy wires DML disposed around one connecting part CM. The cut parts CTP-A1 and CTP-A2 may include a first cut part CTP-A1 and a second cut part CTP-A2. The first cut part CTP-A1 may overlap the first connecting electrode CNE1, and the second cut part CTP-A2 may overlap the second connecting electrode CNE2.

Each of the first and second cut parts CTP-A1 and CTP-A2 may have a width equal to or greater than that of each of the first and second connecting electrodes CNE1 and CNE2. The above width may represent a width in parallel to the first direction DR1. Also, the width of each of the first and second cut parts CTP-A1 and CTP-A2 may correspond to that of a partially removed area of the dummy wires DML defining the first and second cut parts CTP-A1 and CTP-A2.

On the plane, the dummy wires DML and the first and second connecting electrodes CNE1 and CNE2 may not overlap each other. Referring to FIG. 8B, the dummy wires DML are not disposed below the first connecting electrode CNE1. Accordingly, although the phenomenon in which the first insulation layer IL1 (refer to FIG. 6A) covering the dummy wires DML is damaged may occurs, a the dummy wires DML and the first and second connecting electrodes CNE1 and CNE2 may be prevented from being short circuited.

Figure 9A:
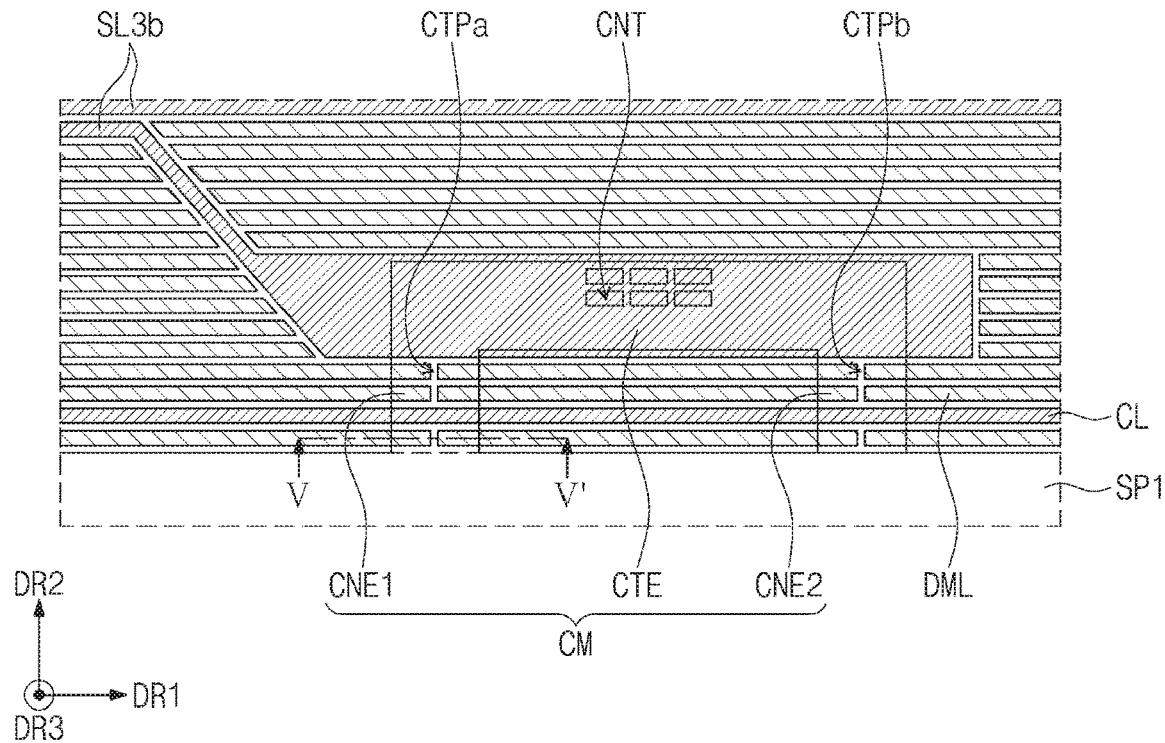
FIG. 9A is an enlarged plan view illustrating an area corresponding to the area AA' in FIG. 4 according to an embodiment of the inventive concept.
Figure 9B:
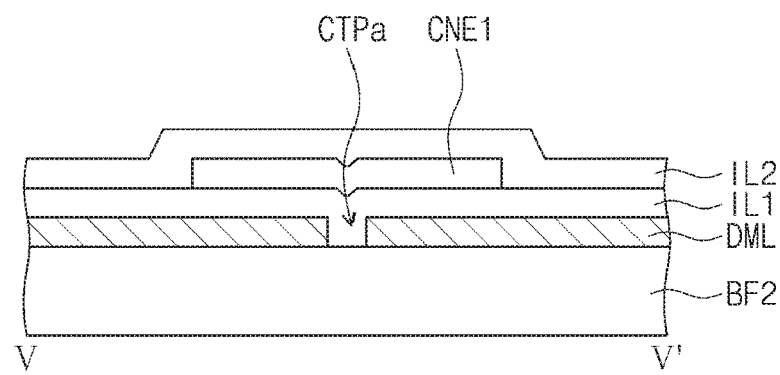
FIG. 9B is a cross-sectional view taken along line V-V' of FIG. 9A.
Figure 9B:
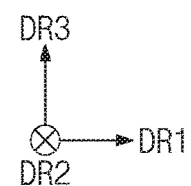

FIG. 9A is an enlarged plan view illustrating an area corresponding an area AA' in FIG. 4 according to an embodiment of the inventive concept, and FIG. 9B is a cross-sectional view taken along line V-V' of FIG. 9A.

Referring to FIGS. 9A and 9B, cut parts CTPa and CTPb are defined in each of the dummy wires DML disposed around one connecting part CM. The cut parts CTPa and CTPb may include a first cut part CTPa and a second cut part CTPb. The first cut part CTPa may overlap the first connecting electrode CNE1, and the second cut part CTPb may overlap the second connecting electrode CNE2. In another embodiment of the inventive concept, at least one of the first cut part CTPa and the second cut part CTPb may be omitted.

According to an embodiment of the inventive concept, the cut part is defined in each of the dummy wires DML. Each of the dummy wires DML may not have a length equal to or greater than a predetermined length due to the cut part. Accordingly, although an unintentional signal may be applied to the dummy wires DML, an amount of coupling capacitance generated between the dummy wires DML and the connecting wire CL may be equal to or less than a predetermined value. Accordingly, a phenomenon in which the sensing sensitivity of the sensing unit SU (refer to FIG. 4) is reduced by the coupling capacitance, and a misrecognition phenomenon in which a touch that is not generated is recognized as a touch, may be prevented. Thus, the sensing unit SU may have improved reliability.

Figure 10:
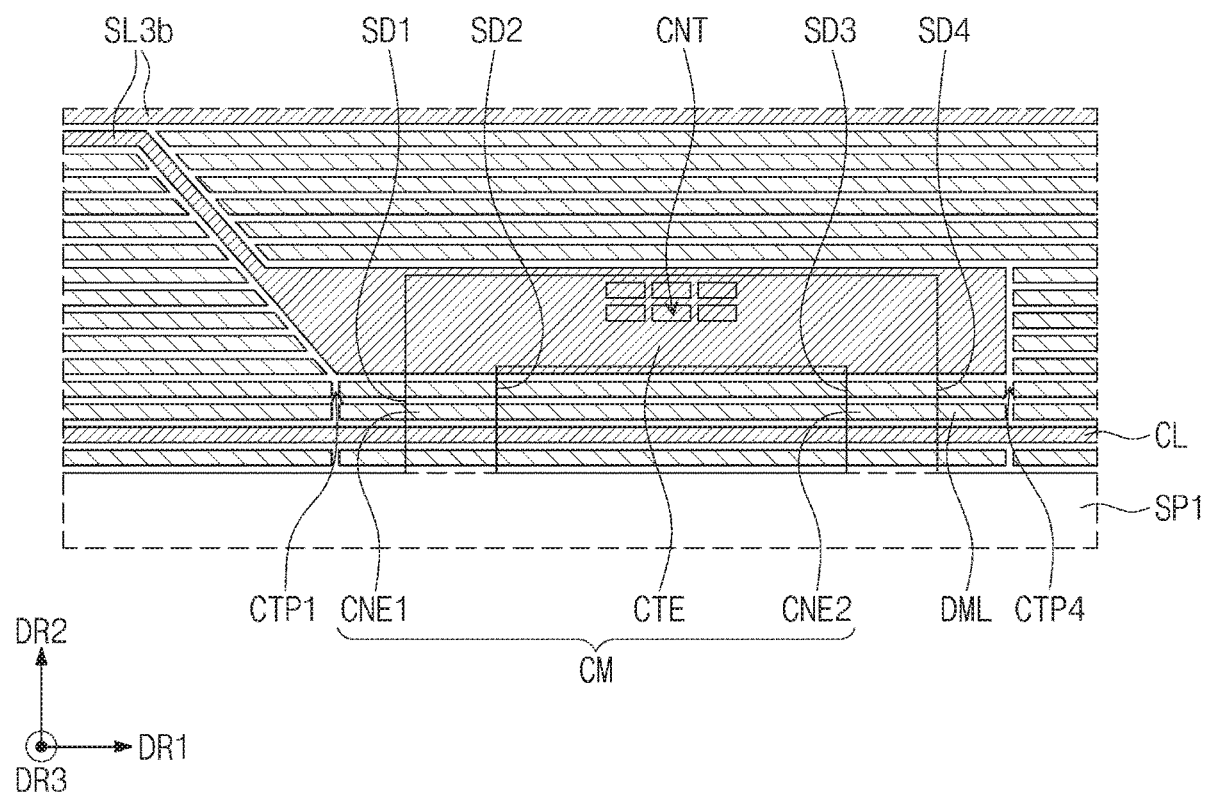
FIG. 10 is an enlarged plan view illustrating an area corresponding to the area AA' in FIG. 4 according to an embodiment of the inventive concept.

FIG. 10 is an enlarged plan view illustrating an area corresponding to area AA' in FIG. 4 according to an embodiment of the inventive concept.

Referring to FIG. 10, when compared with FIG. 7A, a structure, in which the second cut part CTP2 (refer to FIG. 7A) and the third cut part CTP3 (refer to FIG. 7A) are omitted, is illustrated.

At least one connecting part CM is provided in one first sensing pattern SP1. The cut parts CTP1 and CTP4 may be defined at one side and the other side of the connecting part CM. Accordingly, a distance between two adjacent cut parts CTP1 and CTP4 may be equal to or less than a width WTa (refer to FIG. 4) of the first sensing pattern SP1.

Although at least a portion of the dummy wires DML is short-circuited with the connecting part CM, since each of the dummy wires DML has a short length, an amount of coupling capacitance generated between the dummy wires DML and the connecting wire CL may be equal to or less than a predetermined value. Accordingly, a phenomenon in which the sensing sensitivity of the sensing unit SU (refer to FIG. 4) is reduced by the coupling capacitance, and a misrecognition phenomenon in which a touch that is not generated is recognized as a touch, may be prevented.

Figure 11:
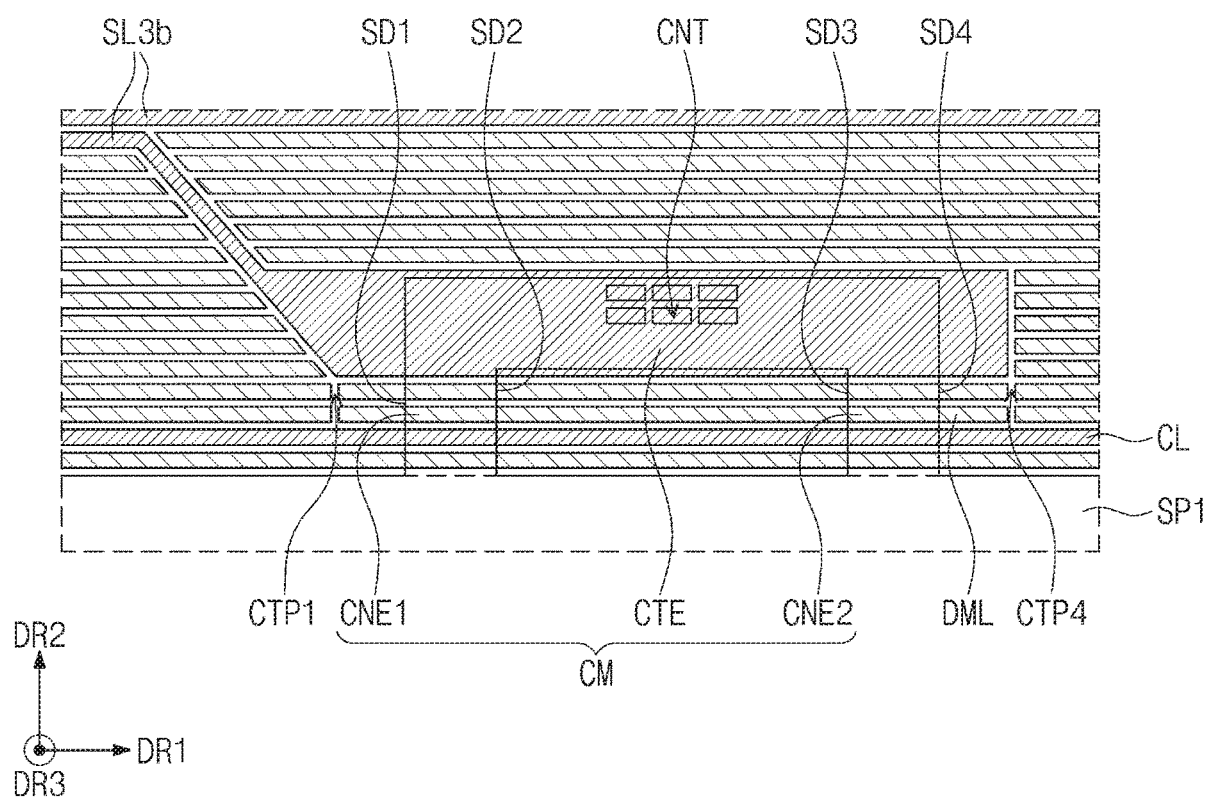
FIG. 11 is an enlarged plan view illustrating an area corresponding to the area AA' in FIG. 4 according to an embodiment of the inventive concept.

FIG. 11 is an enlarged plan view illustrating an area corresponding to area AA' in FIG. 4 according to an embodiment of the inventive concept.

Referring to FIG. 11, when compared with FIG. 10, cut parts may not be defined in the dummy wire DML disposed between the connecting wire CL and the first sensing pattern SP1.

In a process of forming the contact hole CNT for connecting the connecting part CM to the third sensing wire SL3b, a phenomenon in which the insulation layer covering the dummy wires DML is damaged may occur. A possibility of a phenomenon in which the insulation layer is damaged is greater in an area adjacent to the contact hole CNT than an area away from the contact hole CNT. Accordingly, the cut parts CTP1 and CTP4 may be defined in only the dummy wires DML disposed between the connecting wire CL and the third sensing wire SL3b. Also, the cut parts may not be defined in the dummy wire DML between the connecting wire CL and the first sensing pattern SP1, which are relatively spaced therefrom.

According to the embodiment of the inventive concept, the cut part is defined in each of the dummy wires. Each of the dummy wires may have a predetermined length due to the cut part. Accordingly, although the unintentional signal is applied to the dummy wires, an amount of the coupling capacitance generated between the dummy wires and the connecting wire may be equal to or less than a predetermined value. Accordingly, the phenomenon in which the sensing sensitivity of the sensing unit is reduced by the coupling capacitance, and a misrecognition phenomenon in which a touch that is not generated is recognized as a touch, may be prevented. Thus, the sensing unit SU may have the improved reliability.

Although the exemplary embodiments of the present inventive concept have been described, it is understood that the present inventive concept should not be limited to these exemplary embodiments but various changes and modifications can be made by one ordinary skilled in the art within the spirit and scope of the present inventive concept as hereinafter claimed. Hence, the real protective scope of the inventive concept shall be determined by the technical scope of the accompanying claims.

What is claimed is:

1. A sensing unit comprising:
    a base layer;
    a sensing pattern part comprising a first sensing pattern, a second sensing pattern, and a third sensing pattern, which are each disposed on the base layer;
    a sensing wire disposed on the base layer and electrically connected to the first sensing pattern;
    a connecting wire disposed on the base layer and connecting the second sensing pattern to the third sensing pattern, and disposed between the sensing wire and the first sensing pattern;

a dummy wire disposed on the base layer and disposed between the sensing wire and the first sensing pattern; and
a connecting part connected to the first sensing pattern and to the sensing wire and overlapping the connecting wire and the dummy wire on a plane,
wherein a cut part is defined in the dummy wire,
wherein the connecting wire and the dummy wire are disposed on a same layer,
wherein the connecting part is disposed on a different layer as the sensing wire and the connecting wire,
wherein the dummy wire is separated into a plurality of portions by the cut part, and the plurality of portions are electrically separated from each other,
wherein a length of each of the plurality of portions is shorter than a length of the connecting wire, and
wherein a distance between two adjacent cut parts is equal to or less than a width of the first sensing pattern.

2. The sensing unit of claim 1, wherein the cut part overlaps the connecting part on the plane.

3. The sensing unit of claim 2, wherein the dummy wire does not overlap the connecting part on the plane.

4. The sensing unit of claim 1, wherein the cut part does not overlap the connecting part on the plane.

5. The sensing unit of claim 4, wherein the dummy wire extends in a first direction, and the cut part is spaced apart from the connecting part in the first direction on the plane.

6. The sensing unit of claim 4, wherein the cut part is provided in plurality, and the cut parts are spaced apart from each other with the connecting part therebetween on the plane.

7. The sensing unit of claim 1, wherein the connecting part comprises:
a first connecting electrode extending in a second direction from the first sensing pattern to the sensing wire;
a second connecting electrode extending in the second direction from the first sensing pattern to the sensing wire and spaced apart from the first connecting electrode in a first direction; and
a contact electrode configured to connect the first connecting electrode to the second connecting electrode and connected to the sensing wire.

8. The sensing unit of claim 7, wherein the cut part overlaps at least one of the first connecting electrode and the second connecting electrode on the plane.

9. The sensing unit of claim 7, wherein the first connecting electrode comprises first and second sides each extending in the second direction crossing the first direction, the second connecting electrode comprises third and fourth sides each extending in the second direction, and the cut part is defined in an area that is adjacent to at least one of the first side, the second side, the third side, and the fourth side.

10. The sensing unit of claim 9, wherein the cut part is provided in plurality, some of the cut parts are spaced apart from each other with the first connecting electrode therebetween, and some of the cut parts are spaced apart from each other with the second connecting electrode therebetween.

11. The sensing unit of claim 1, wherein a first sensing area, a second sensing area, and a third sensing area are defined on the base layer, the first sensing pattern is disposed on the first sensing area, the second sensing pattern is disposed on the second sensing area, the third sensing pattern is disposed on the third sensing area, the second sensing area and the third sensing area are spaced apart from each other in a first direction, and each of the second and third sensing areas protrudes from the first sensing area in a second direction crossing the first direction, and
wherein a width of the first sensing area in the first direction is greater than each of a width of the second sensing area in the first direction and a width of the third sensing area in the first direction.

12. The sensing unit of claim 1, wherein the dummy wire is provided in plurality, and one portion of the dummy wires is disposed between the connecting wire and the first sensing pattern, and another portion of the dummy wires is disposed between the connecting wire and the sensing wire.

13. The sensing unit of claim 1, wherein the cut part is defined by removing a partial area of the dummy wire.

14. The sensing unit of claim 1, wherein the cut part is provided in plurality, and two cut parts that are adjacent to each other among the plurality of cut parts are spaced by a first distance from each other.

15. The sensing unit of claim 14, wherein the first distance is equal to or less than a width of the first sensing pattern.

16. A sensing unit comprising:
a sensing pattern part comprising a first sensing pattern, a second sensing pattern, and a third sensing pattern;
a sensing wire electrically connected to the first sensing pattern;
a connecting part connecting the sensing wire to the first sensing pattern;
a connecting wire connecting the second sensing pattern to the third sensing pattern, crossing the connecting part on a plane, and disposed between the sensing wire and the first sensing pattern;
a dummy wire disposed on a same layer as the connecting wire; and
a cut part defined in the dummy wire,
wherein the connecting part is disposed on a different layer as the sensing wire and the connecting wire,
wherein the dummy wire is separated into a plurality of portions by the cut part, and the plurality of portions are electrically separated from each other,
wherein a length of each of the plurality of portions is shorter than a length of the connecting wire, and
wherein a distance between two adjacent cut parts is equal to or less than a width of the first sensing pattern.

17. The sensing unit of claim 16, wherein the connecting part crosses the connecting wire in a perpendicular manner on the plane.

18. The sensing unit of claim 16, wherein the connecting part contains a transparent conductive material.

19. A sensing unit comprising:
a base layer including a sensing area sensing an input and a non-sensing area;
a connecting wire disposed on the non sensing area of the base layer;
a sensing wire disposed on the non-sensing area of the base layer;
a dummy wire disposed on the non-sensing area of the base layer and in which at least one cut part is defined by removing one area of the dummy wire;
an insulation layer disposed on the base layer to cover the sensing wire, the connecting wire, and the dummy wire;
a sensing pattern disposed on the insulation layer and the sensing area; and
a connecting part disposed on the insulation layer to connect the sensing pattern to the sensing wire,
wherein the dummy wire is disposed between the sensing pattern and the sensing wire on a plane,
wherein the connecting wire and the dummy wire are disposed on a same layer, wherein the connecting part is disposed on a different layer as the sensing wire and the connecting wire, wherein the dummy wire is separated into a plurality of portions by the cut part, and the plurality of portions are electrically separated from each other, wherein the dummy wire and the connecting wire are disposed between the sensing pattern and the sensing wire on the plane, and wherein a length of each of the plurality of portions is shorter than a length of the connecting wire.

20. The sensing unit of claim 19, wherein the dummy wire overlaps the connecting part on the plane, and the cut part does not overlap the connecting part on the plane.

* * * * *